United States Patent
Patel et al.

(10) Patent No.: US 9,967,189 B2
(45) Date of Patent: *May 8, 2018

(54) SYSTEM AND METHOD FOR DETERMINING NETWORK CONDITIONS

(75) Inventors: Sujal M. Patel, Seattle, WA (US); Jeffrey M. Ayars, Federal Way, WA (US); Rahul Agarwal, Seattle, WA (US); Bradley D. Hefta-Gaub, Seattle, WA (US); Peter S. Haight, Berkeley, CA (US); Dale R. Stammen, Seattle, WA (US); Philip Rosedale, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 1819 days.

This patent is subject to a terminal disclaimer.

(21) Appl. No.: 12/965,750

(22) Filed: Dec. 10, 2010

(65) Prior Publication Data

US 2011/0080840 A1    Apr. 7, 2011

Related U.S. Application Data

(63) Continuation of application No. 10/800,535, filed on Mar. 15, 2004, now Pat. No. 7,948,906, which is a
(Continued)

(51) Int. Cl.
*H04L 12/26* (2006.01)
*H04L 12/801* (2013.01)
*H04L 12/841* (2013.01)

(52) U.S. Cl.
CPC .......... *H04L 47/11* (2013.01); *H04L 43/062* (2013.01); *H04L 43/0852* (2013.01);
(Continued)

(58) Field of Classification Search
USPC ....... 370/229, 230, 235, 241, 252, 253, 468, 370/389, 392, 503, 508, 516–518
See application file for complete search history.

(56) References Cited

U.S. PATENT DOCUMENTS 5,477,531 A * 12/1995 McKee et al. ............... 370/249
6,021,129 A *  2/2000 Martin et al. ............ 370/395.72
(Continued)

OTHER PUBLICATIONS

Patel, Sujal M et al., "System and Method for Determining Network Conditions," U.S. Appl. No. 10/800,535, USPTO Notice of Allowance dated Jan. 25, 2011.

*Primary Examiner* — Kwang B Yao
*Assistant Examiner* — Nguyen Ngo
(74) *Attorney, Agent, or Firm* — Schwabe, Williamson & Wyatt, P.C.

(57) ABSTRACT

A system and a method determine network conditions. The system includes a server computer and a client computer. The server computer is configured to transmit data packets comprising a data object from the server computer to the client computer. The client computer includes a transmission latency detector and a transmission bandwidth detector. The transmission latency detector uses transmission time and receipt time values to determine the changes in time it takes selected portions of the data object to be transmitted from the server computer to the client computer. The transmission bandwidth detector uses identified back-to-back data packets to determine the transmission bandwidth between the server computer and the client computer.

16 Claims, 4 Drawing Sheets

Related U.S. Application Data continuation of application No. 09/246,506, filed on Feb. 8, 1999, now Pat. No. 6,731,600.

(52) U.S. Cl.
CPC .............. *H04L 47/10* (2013.01); *H04L 47/18* (2013.01); *H04L 47/283* (2013.01)

(56) References Cited

U.S. PATENT DOCUMENTS

| | | | |
|---|---|---|---|
| 6,094,431 A * | 7/2000 | Yamato et al. | 370/395.21 |
| 6,791,943 B1 * | 9/2004 | Reynolds | 370/232 |
| 7,103,050 B1 * | 9/2006 | Luijten et al. | 370/395.21 |
| 7,948,906 B1 * | 5/2011 | Patel et al. | 370/252 |

* cited by examiner

SYSTEM AND METHOD FOR DETERMINING NETWORK CONDITIONS

RELATED APPLICATION

This application is a continuation of U.S. patent application Ser. No. 10/800,535, filed Mar. 15, 2004, which is a continuation of U.S. Pat. No. 6,731,600 (originally U.S. patent application Ser. No. 09/246,506), filed Feb. 8, 1999. U.S. patent application Ser. Nos. 09/246,506 and 10/800,535 are hereby incorporated by reference in their entirety.

BACKGROUND OF THE INVENTION

Field of the Invention

The invention relates to determining network conditions. More particularly, the invention provides a system and a method for determining a transmission latency and a maximum transmission bandwidth for a network connection between a server computer and a client computer.

Description of the Related Technology

Figure 1:
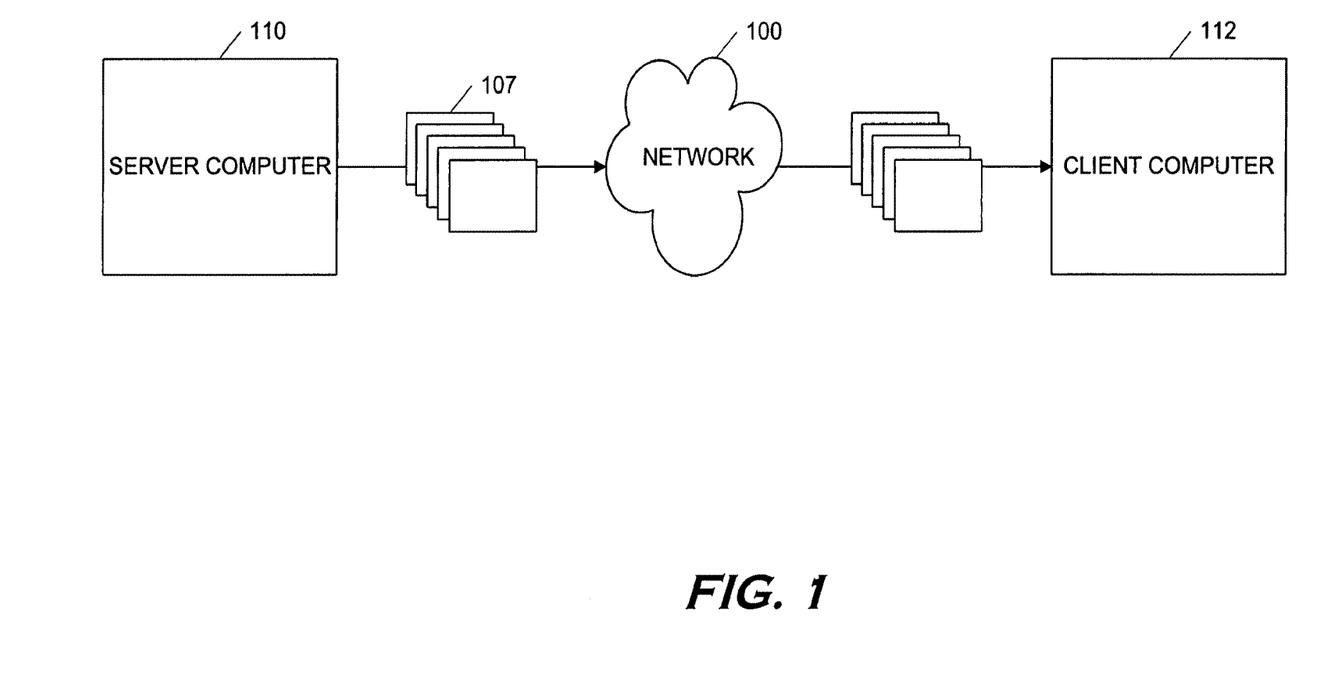
FIG. 1 illustrates a high-level block diagram of a data object distribution system that can be used with an embodiment of the present invention.

Today, more than ever, people transmit and receive data objects, including video, text, graphic and other data, over a network. People now expect and demand that the data objects be transmitted quickly and without errors. FIG. 1 illustrates a typical data object distribution system for distributing data objects 107.

The data object 107, located on the server computer 110, is made available for further distribution over a network 100, such as the Internet, to one or more client computers 112. The client computer 112 generally requests the data object 107, begins receiving portions of it, and possibly begins rendering the data object 107 for presentation to an end user. As part of the transmission process, the server computer 110 typically breaks the data object 107 into a sequence of packets by a process called "packetization." After packetization, the server computer 110 sends in succession each of the packets to the client computer 112.

During presentation, the server computer 110 can transmit the data object 107 at one of a variety of transmission rates. For example, the server computer 110 may initiate transmission of the data object to the client computer 112 at 20 kilobits per second (kbps). However, due to sources of interference such as, for example, noise or network congestion, or other problems, the client computer 112 may not receive the packets at a rate of 20 kbps. Thus, the actual available transmission capacity may not support a 20 kbps rate. Alternatively, transmission capacity may increase rather than decrease—even during the transmission of the data object 107. Without the ability to quickly detect changes in network conditions, the degree of change, or both, the transmission rate cannot be optimized, or even confidently improved.

Therefore, there is a need for a system that can detect network conditions. The system should be able to detect changes in latency in the transmission of packets, estimate the maximum transmission bandwidth for a network or both. The transmission latency and the maximum transmission bandwidth could advantageously be used by standard network systems, such as a transmission rate control device, to determine an optimal transmission rate for the data objects.

SUMMARY OF THE INVENTION

The system and method of the present invention have several features, no single one of which is solely responsible for its desirable attributes. Without limiting the scope of this invention as expressed by the claims that follow, its more prominent features will now be discussed briefly. After considering this discussion, and particularly after reading the section entitled "Detailed Description of the Invention" one will understand how the features of this invention provide several advantages over traditional streaming systems.

One embodiment of the present invention is a method for determining a transmission bandwidth. The method comprises receiving a first data packet and a second data packet from a server computer over a communication link to the server computer, and determining a transmission bandwidth of said communication link, responsive to the receipt of the data packets. Another aspect of the embodiment is one additionally comprising accessing at least one identifier in a first data packet, the identifier indicating that the first data packet and the second data packet are being sent back-to-back relative to each other. Yet another aspect of the embodiment is one additionally comprising: (1) receiving the first data packet in the client computer; (2) identifying a first point in time upon the completion of the receipt of the first data packet; (3) receiving the second data packet; (4) identifying a second point in time upon the completion of the receipt of the second data packet; (5) determining the difference between the first point in time and the second point in time; (6) determining a quantity of data in the second data packet; and (7) determining the transmission bandwidth based on the determined difference and the determined quantity. Still another aspect of the embodiment determines the transmission bandwidth based on the determined difference and the determined quantity by applying the equation:

bandwidth=the determined quantity/(the determined difference+a correction factor);

wherein the correction factor is a heuristically obtained number to account for impreciseness of time obtained from a time provider. Another aspect of the embodiment is one comprising applying a compensation factor which compensates for the granularity of a system clock. Yet another aspect of the embodiment is one comprising reporting to a software module the determined transmission bandwidth. Still another aspect of the embodiment is one wherein the first data packet and the second data packet are sent from the server computer back-to-back relative to each other. A further aspect of that embodiment is comprising: (1) receiving one or more back-to-back packets subsequent to the receipt of the first data packet and the second data packet, each of the back-to-back packets including a first data packet and a second data packet; (2) identifying a first point in time for each of the back-to-back packets corresponding to the completion of the receipt of the first data packet in each of the back-to-back packets; (3) identifying a second point in time for each of the back-to-back packets corresponding to the completion of the receipt of the second data packet in each of the back-to-back packets; (4) determining the differences between the first point in time and the second point in time with respect to each of the back-to-back packets; (5) determining a quantity of data in each of the second data packets; and (6) determining the transmission bandwidth based on the determined differences and the determined quantities. Still another aspect of that embodiment is one wherein determining the transmission bandwidth based on the determined differences and the determined quantities includes the act of applying the following equation:

bandwidth=a total packet size/(a total packet time+a correction factor);

wherein the total packet size is equal to the combined sizes of each of the second data packets in a selected number of the back-to-back packets, the correction factor accounts for impreciseness of time obtained from a time provider, and the total packet time is the sum of the respective time intervals beginning upon receipt of the first data packet in each of the selected back-to-back packets and ending upon receipt of the associated second data packet. In another aspect, the embodiment further comprises applying a compensation factor which compensates for the granularity of a system clock. Still another aspect of the embodiment further comprises reporting to a software module the determined transmission bandwidth. In yet another aspect, the embodiment is one wherein the data packets collectively provide a streaming media presentation. A still a further aspect, the embodiment is one wherein the determined transmission bandwidth is an estimation of a maximum transmission bandwidth between the server computer and a receiving computer.

Another embodiment of the invention is a method for determining network conditions. The method comprises: (1) receiving one or more data packets from a server computer over a communication link to the server computer; and (2) determining a transmission latency, responsive to the receipt of the data packets. In another aspect, the embodiment additionally comprises applying the following equation:

latency=clock time−base time−timestamp;

wherein clock time is a time corresponding to the receipt by a receiving computer of the one or more data packets, base time is a reference time measuring the time it takes for the one or more data packets to be transmitted from the server computer to the receiving computer, and timestamp is a time corresponding to the beginning of the transmission of the one or more data packets. Another aspect of the embodiment further comprises accessing a timestamp in each of the one or more data packets, each timestamp approximately identifying a point in time when the server computer began transmitting the respective data packet. Still another aspect of the embodiment further comprises modifying each of the timestamps to account for any clock skew between a clock of the server computer and a clock of a receiving computer. A still further aspect of the embodiment further comprises reporting to a software module the transmission latency. Another aspect of the embodiment is one wherein the data packets collectively comprise a portion of a media presentation rendered to a user.

Another embodiment of the invention is a system for determining a transmission bandwidth. The system comprises: (1) a packet receiver which receives one or more data packets from a first computer over a communication link; and (2) a transmission bandwidth detector which determines a transmission bandwidth associated with the communication link, responsive to the receipt of back-to-back data packets by the packet receiver. Another aspect of the embodiment is one wherein the transmission bandwidth detector applies the following equation:

bandwidth=a determined quantity/(a determined difference+a correction factor);

wherein each of the back-to-back packets includes a first data packet and a second data packet; and wherein the determined quantity represents the combined sizes of the second data packets in selected back-to-back data packets, the determined difference is the sum of the respective time intervals beginning approximately upon receipt of the first data packet in each of the selected back-to-back packets and ending approximately upon receipt of the associated second data packet, and the correction factor accounts for impreciseness of time obtained from a time provider. In another aspect of the embodiment, the system further comprises back-to-back packet identifiers received by the packet receiver, the back-to-back packet identifiers indicating which data packets are transmitted back-to-back relative to each other. Still another aspect of the embodiment is one wherein the transmission bandwidth detector estimates the amount of available transmission bandwidth between the server computer and the client computer. Yet another aspect of the embodiment is one wherein the transmission bandwidth detector reports the transmission bandwidth to the packet receiver. A further aspect of the embodiment is one wherein the transmission bandwidth detector estimates a maximum transmission bandwidth between the server computer and the client computer.

Still another embodiment of the present invention is a system for determining a latency in data communication. The system comprises: (1) a packet receiver which receives one or more data packets from a first computer; and (2) a latency detector which determines changes in latency in data communication from the first computer to a second computer, responsive to the receipt of the data packets by the packet receiver. Another aspect of the embodiment is one wherein the latency detector applies the following equation:

latency=clock time−base time−timestamp;

wherein clock time is a time corresponding to the receipt by the second computer of the one or more data packets, base time is a reference time measuring the time it takes for the one or more data packets to be transmitted from the first computer to the second computer, and timestamp is a time corresponding to the beginning of the transmission of the one or more data packets. A further aspect of the embodiment is one wherein the transmission latency detector reports the transmission latency to the packet receiver. A still further aspect of the embodiment is one wherein the data packets collectively provide a streaming media presentation.

Yet another embodiment of the present invention is a system for determining network conditions. The system comprises (1) means for receiving in a client computer a first data packet and a second data packet from a server computer; (2) means for identifying the first and second data packets as back-to-back packets; and (3) means for determining a total second packet size and a total second data packet receipt time to calculate a transmission bandwidth in a communication link from the server computer to the client computer, responsive to the receipt of the data packets by the client computer.

A still further embodiment of the present invention is a system for determining network conditions. The system comprises: (1) means for receiving in a client computer one or more data packets from a server computer; (2) means for identifying an approximate time of transmission of the one or more data packets; (3) means for identifying an approximate time of receipt of the one or more data packets; and (4) means for determining a base time from the times of transmission and receipt to derive latency in data communication between the server computer and the client computer.

DETAILED DESCRIPTION OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

System Overview

FIG. 1 illustrates a high-level block diagram of a data object distribution system that can be used with an embodiment of the present invention. The system includes a network 100, a server computer 110 connected to the network 100, and at least one client computer 112 also connected to the network 100.

It is noted that server computer 110 and the client computer 112 may each be any conventional general purpose computer using one or more microprocessors, such as a Pentium processor, a Pentium II processor, a Pentium Pro processor, an xx86 processor, an 8051 processor, a MIPS processor, a Power PC processor, or an ALPHA processor. It is noted that each of the server computer 110 and the client computer 112 includes a system clock (not shown).

The network 100 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). The network 100 can include any communication link between two computers. Note that computing devices may be desktop, server, portable, handheld, set-top, or any other desired type of configuration. As used herein, an Internet includes network variations such as public internet, a private internet, a secure internet, a private network, a public network, a value-added network, and the like.

The server computer 110 is configured to maintain and store one or more data objects 107. The data object 107 can include any type of data that can be broken apart into packets for transmission across the network 100. Types of data objects 107 include, for example, a word processor document file, a database file, Joint Photographic Experts Group (JPEG) file, a Motion Picture Experts Group file (MPEG), or an AVI file. In one embodiment of the invention, the data objects can be rendered by the client computer 112 to a user.

Figure 2:
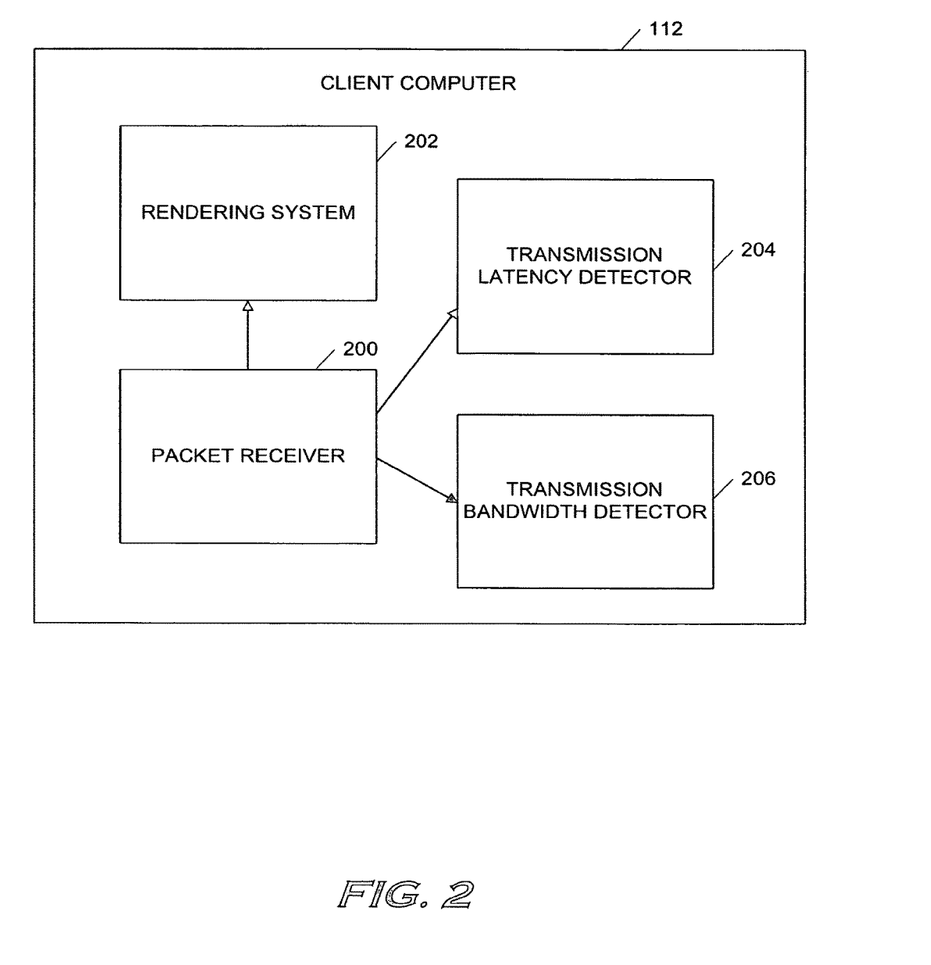
FIG. 2 is a high-level functional block diagram of the client computer of FIG. 1 having a transmission latency detector and a transmission bandwidth detector according to one embodiment of the present invention.

In one embodiment of the present invention, the client computer 112 includes a packet receiver 200 (FIG. 2). The packet receiver 200 is in operable communication with an operating system (not shown) that resides on the client computer 112. The operating system may include, for example: UNIX, Disk Operating System (DOS), OS/2, Windows 3.X, Windows 95, Windows 98 and Windows NT. Specifically, the packet receiver 200 is in communication with the portion of the operating system that provides network services.

The packet receiver 200 is connected to a rendering system 202. The packet receiver 200 provides to the rendering system 202 each of the packets of the data object 107 as they are received from the network 100. The rendering system 202 displays the data object 107 to the user.

The packet receiver 200 is also connected to a transmission latency detector 204 and a transmission bandwidth detector 206. The transmission latency detector 204 determines the approximate time it takes the packet receiver 200 to receive each of the data packets from the server computer 110. A process of using the transmission latency detector 204 is set forth below with reference to FIG. 3. The transmission bandwidth detector 206 estimates a maximum transmission rate between the server computer 110 (FIG. 1) and the client computer 112 (FIG. 1). A process of using the transmission bandwidth detector 206 is set forth below with reference to FIG. 4.

It is noted that in one embodiment, the packet receiver 200 contains transmission rate adjustment logic (not shown) which can communicate with the server computer 110. The transmission rate adjustment logic is capable of requesting the server computer 110 (FIG. 1) to adjust the transmission rate of packets from the server computer 110 to the client computer 112 (FIG. 1), depending on the calculations performed by the latency detector 204, the transmission rate detector 206, or both.

The packet receiver 200, the rendering system 202, the latency detector 204, and the transmission bandwidth detector 206 may each be written in any programming language such as C, C++, BASIC, Pascal, Java, and FORTRAN and run under the operating system. C, C++, BASIC, Pascal, Java, and FORTRAN are industry standard programming languages for which many commercial compilers can be used to create executable code.

Further, as can be appreciated by one of ordinary skill in the art, the packet receiver 200, the rendering system 202, the transmission latency detector 204, and the transmission bandwidth detector 206 are software modules that comprise various sub-routines, procedures, definitional statements, and macros. Each of the foregoing software modules are typically separately compiled and linked into a single executable program. Therefore, the following description of each of the modules 202-206 is used for convenience to describe the functionality of the client computer 112. Thus, the processes or functions occurring within, contributed to, or controlled by the packet receiver 200, the rendering system 202, the transmission latency detector 204, the transmission bandwidth detector 206, or a combination thereof, may be arbitrarily redistributed to one of the other software modules, combined together in a single module, or made available in a shareable dynamic link library. It will be appreciated that, as used herein, a module refers to a collection of instructions stored on a non-volatile medium or in a computer-readable format.

1. System Operation

The description of the method for determining network conditions is described below in two sections. The first section describes the process for measuring changes in transmission latency over time. The second section describes the process for measuring a maximum transmission bandwidth.

Latency Determination

Figure 3:
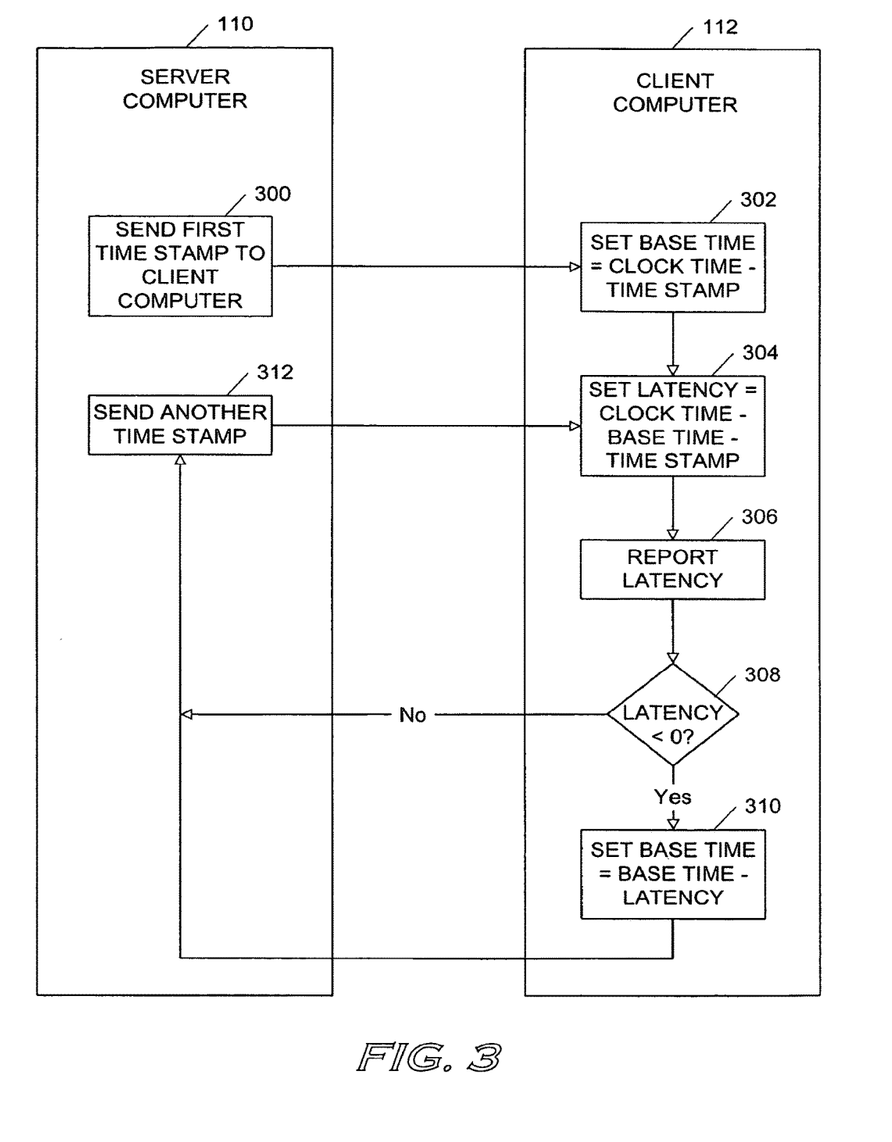
FIG. 3 is a flowchart in accordance with an embodiment of the present invention illustrating a transmission latency measuring process of the transmission latency detector of FIG. 2.

FIG. 3 is a flowchart illustrating a process in accordance with one embodiment of the invention for measuring the changes in transmission latency between data packets that are received by the client computer 112 (FIG. 1). In one embodiment of the invention, each of the states represented in FIG. 3 as being associated with the client computer 112 is performed by the transmission latency detector 204 (FIG. 2). Latency detection may begin when the client computer 112 has requested the server computer 110 (FIG. 1) to transmit the data object 107 to the client computer 112. The server computer 110 has already packetized the data object 107 into a sequence of data packets, and the server computer 110 is ready to transmit the data packets to the client computer 112 (FIG. 1).

Starting at a state 300, the server computer 100 (FIG. 1) inserts a timestamp into one of the data packets. In one embodiment of the invention, the value of the timestamp is obtained by issuing a request to an operating system (not shown) that is executing on the server computer 110. In one embodiment of the invention, the timestamp is provided in a millisecond resolution. In another embodiment of the invention, the timestamp indicates the system time, such as "12:05:56 a.m." In yet another embodiment of the invention, the timestamp is a value based upon an arbitrary starting point, such as the start of transmission of the data packets. However, it is to be appreciated that other methods exist for obtaining a timestamp such as directly polling a system clock.

Next, at a state 302, the client computer 112 (FIG. 1) receives the data packet. At the state 302, the client computer 112 determines a value for the variable "base time" according to Equation 1 which is set forth below.

clock time=Time provided by the client computer 112.
timestamp=Time identified in data packet transmitted in state 300 of FIG. 3.

$$\text{base time}=\text{clock time}-\text{timestamp}. \quad (1)$$

The variable "base time" initially represents a time interval associated with the time taken by the first data packet to be sent by the server computer 110 and received by the client computer 112. For example, the server computer 110 may provide a "timestamp" of "12" for the first data packet, and the client computer 112 may determine a "clock time" of "94" upon receipt of the first data packet. In the example, the "base time" would be "82."

In one embodiment of the invention, the variable "clock time" is provided by an operating system (not shown) that runs on the client computer 112. For example, assume that the server computer sent a timestamp of "1." Further, assume that the variable "clock time" has a value of "99." In this example, the variable "base time" is equal to "98."

The value of the variable "base time" may be adjusted and thus used as a reference time for determining changes in latency with respect to subsequently received data packets. For example and as will be described in further detail below, if a data packet is transmitted relatively quickly, its timestamp may contribute to a downward adjustment of the value of the variable "base time."

Moving to a state 304, the client computer 112 determines the latency of the packets according to Equation 2, which is set forth below.

clock time=Most recent time provide by the client computer 112.
base time=Value of the variable "base time" that was determined in the state 302 or the value of the variable "base time" that was calculated in a state 310 in a previous iteration of states 304-312, whichever was later.
timestamp=Value of last timestamp provided by the server computer 100 in the most recent data packet.

$$\text{latency}=\text{clock time}-\text{base time}-\text{timestamp}. \quad (2)$$

The variable "latency" provides a measure of the change in the time during which a data packet travels from the server computer 110 to the client computer 112 relative to the time associated with the transmission of previous data packets. It is noted that after receiving the first timestamp, the value of the clock time is equal to the variable "clock time" identified above in state 302. However, after the client computer 112 receives subsequent timestamps, the value of the variable "clock time" is updated each time a new data packet is received from the server computer 110.

For example and continuing to use the exemplary values identified with reference to state 302, after receiving the first timestamp, the values of the variables in Equation 2 are "0" for "latency", "99" for "clock time", "98" for "base time", and "1" for "timestamp" (0=99−98−1). Thus, after receiving the first data packet, the latency is "0." Although it is noted that the actual transfer time between the server computer 110 and the client computer 112 took greater than zero milliseconds, the value of the variable "latency" is relative and useful to identify the duration of time for the transmission of subsequent packets in relation to the transmission time of the first packet.

Moving to a state 306, the latency detector 204 (FIG. 2) reports the value of the variable "latency" to the packet receiver 200 (FIG. 2). It will be appreciated that the packet receiver 200, or some other module having access to the value of the variable "latency", could use the latency information as a factor in determining whether to adjust the transmission rate between the server computer 110 (FIG. 1) and the client computer 112 (FIG. 1).

Proceeding to a state 308, the client computer 112 determines whether the latency is less than zero. If the value of the latency is zero, this indicates that the data packet arrived more quickly from the server computer 110 than previous data packets. If the value of the variable "latency" is less than zero, the client computer 112 (FIG. 1) proceeds to a state 310. At the state 310, the client computer 112 recalculates the value of the variable "base time" according to Equation 3.

base time=Value of the variable "base time" that was determined in the state 302 or the value of the variable "base time" that was calculated in the state 310 in a previous iteration of states 304-312, whichever was later.
latency=Value of the variable "latency" that was calculated in the state 304.

if base time>0 then base time=base time−|latency|

$$\text{else base time}=\text{base time}-\text{latency}. \quad (3)$$

According to Equation 3, if the value of the latency is less than zero, the value of the variable "base time" is reduced (approaches zero). The reduced value of the variable "base time" provides a basis for determining a new relative measure of the amount of time it takes for a data packet to travel from the server computer 110 to the client computer 112.

An exemplary set of data is set forth below with reference to Table 1 that illustrates the values of the variables in Equations 1, 2, and 3, that result in having a latency of less than zero.

If, in the state 308, the latency is greater than zero, or proceeding from the state 310, the process flow proceeds to a state 312. At the state 312, the server computer 110 (FIG. 1) transmits another timestamp in another data packet.

Table 1, which is set forth below, demonstrates some exemplary values of the variables with reference to selected states. The values in each of the rows of Table 1 are representative of the values of the variables in Equations 1, 2, and 3, subsequent to performing the respective calculation in the state that is identified in the first column of the table. For example, in the first row of Table 1, the value of the variable "base time" is "98" subsequent to executing Equation 1 in state 302.

TABLE 1

| | timestamp | clock time | base time | latency |
|---|---|---|---|---|
| State 302 | 1 | 99 | 98 | un-intialized |
| State 304 | 1 | 99 | 98 | 0 |
| State 312 | 2 | 99 | 98 | 0 |
| State 304 | 2 | 99.9 | 98 | −.1 |
| State 310 | 2 | 99.9 | 97.9 | 0 |

It is noted that the transmission latency detector 204 (FIG. 2) need not be used during the entire transmission of the data object 107 (FIG. 1) from the server computer 110 (FIG. 1) to the client computer 112 (FIG. 1). Optionally, the client computer 112 may enable the latency detection during selected periods of operation such as, for example, at predetermined time intervals, at predetermined threshold percentages of the total quantity of data comprising the data object 107 that has been transmitted, or at other selected periods.

In one embodiment, the server computer 110 multiplies the timestamp by a first correction factor to compensate for any clock skew that may exist between respective clocks of the server computer 110 and the client computer 112. For example, if the system clock (not shown) on the client computer 112 is running faster than the clock of the server computer 110, the client computer 112 may incorrectly determine that the latency is higher than if the clocks were synchronized.

The first correction factor, "1.01" in one embodiment, may be used to ensure that the timestamp provided by the server computer 110 overcompensates for any clock skew. Such overcompensation is advantageous in systems wherein transmission rate control logic (not shown) uses the latency report to control the transmission rate. In such systems, the latency determination may be used to determine whether the server computer 110 should be transmitting at a lower rate. If there existed a clock skew between the server computer 110 and the client computer 112 such that the client computer 112 erroneously determined that it was running slower than the server computer 110, the client computer 112 could request to switch to a lower transmission rate even though actual conditions might not warrant such a switch.

Maximum Transmission Bandwidth Determination

Figure 4:
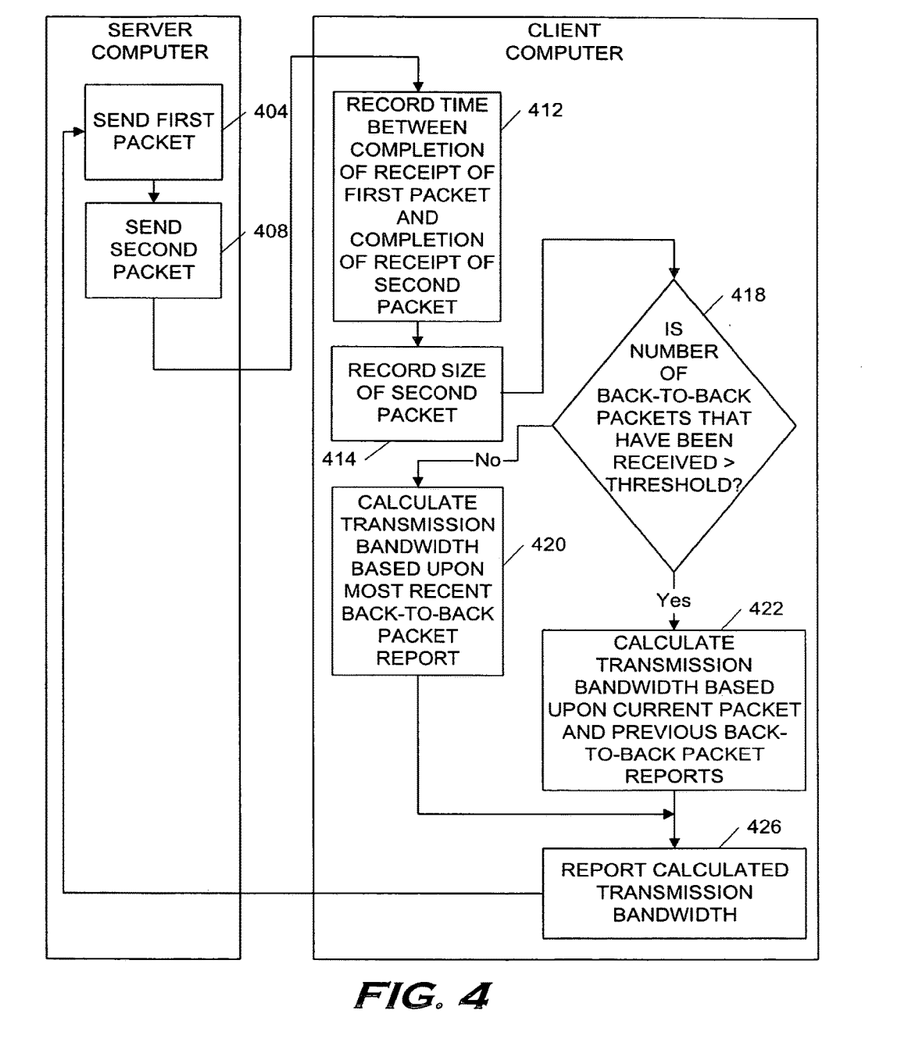
FIG. 4 is a flowchart in accordance with an embodiment of the present invention illustrating a transmission bandwidth measuring process of the transmission bandwidth detector of FIG. 2.

FIG. 4 is a flowchart illustrating a method for estimating the available bandwidth between the server computer 110 (FIG. 1) and the client computer 112 (FIG. 1) via the network 100. In one embodiment of the invention, each of the states shown in FIG. 4, other than those relating to transmitting data packets, is performed by the transmission bandwidth detector 206 (FIG. 2). Bandwidth determination may begin after the client computer 112 has requested the data object 107 (FIG. 1) from the server computer 110, and after the server computer 110 has packetized the data object 107 into a sequence of data packets.

Starting at a state 404, the server computer 110 stores (FIG. 1) a first packet identifier in a header portion of a first data packet. The first packet identifier in the header portion indicates that the server computer 110 is going to transmit a second data packet to the client computer 112 (FIG. 1) immediately after transmitting the first data packet. Thus, the first packet identifier indicates that data packets are being transmitted "back-to-back." Those of ordinary skill in the art will readily appreciate that data packets often include header portions or header blocks. In one embodiment of the invention, the first packet identifier is either a "0" or a "1" in a predefined location in the header information of the first data packet and may be represented by one or more bits. However, it will be appreciated that other identifiers may be used. It will further be appreciated that the first packet identifier need not be in any particular data packet and may even be transmitted alone in its own packet. In this embodiment, the first packet identifier would identify two or more data packets, which are being sent back-to-back. The server computer 110 then sends the first data packet to the client computer 112.

Continuing to a state 408, the server computer 110 stores in a header portion of a second data packet a second packet identifier indicating that the data packet is the second of two data packets. In one embodiment of the invention, similar to the first packet identifier in the first data packet, the second packet identifier is either a "0" or a "1" in a predefined location in the header portion of the data packet. However, it will be appreciated that other identifiers may be used. The server computer 110 then sends the second data packet to the client computer 112.

Alternatively, in one embodiment of the invention, a second data packet identifier is not used in the second data packet. In this embodiment, the client computer 112 assumes that the data packet that is received by the client computer 112 after receiving the first data packet was sent back-to-back with the first data packet.

Proceeding to a state 412, the client computer 112 (FIG. 1) receives in sequence the first data packet and the second data packet. At this state, the client computer 112 (FIG. 1) examines the header information to determine whether these data packets are back-to-back. If these data packets are designated as being back-to-back, the client computer 112 records the length of time between receiving the first data packet and receiving the second data packet. To determine this time, the transmission bandwidth detector 206 may request a timestamp from the operating system (not shown) which executes on the client computer 110. For example, the timestamp associated with the receipt of the first data packet may be 192 milliseconds, and the timestamp for the second data packet may be 303 milliseconds. In this example, the length of time between receiving these two data packets (or second data packet receipt time) is 111 milliseconds.

Next, at a state 414, the client computer 112 (FIG. 1) records the size of the second data packet. In one embodiment, the size is recorded as a number of bytes, but it will be appreciated that other units may be used. For convenience of description, the size of the second data packet along with the second data packet receipt time are collectively referred to as a "back-to-back packet report."

Moving to a state 418, the client computer 110 determines whether to include additional back-to-back packet reports in determining the available bandwidth (or maximum transmission rate) calculation. The client computer 112 may determine the maximum transmission rate differently, based upon how may back-to-back packet reports have been received. One advantage of having multiple procedures for calculating the maximum available transmission rate is that the client computer 112 can compensate for any inaccuracies caused by insufficient precision in time values provided by the operating system of the client computer 112.

Often, the operating system only updates the time during an update period, which may be of a variable duration. For example, the operating system may have a new update period approximately every 20 milliseconds. If an application, such as the transmission bandwidth detector 206, requested a timestamp from the operating system twice within the same update period, the application could erroneously determine that the actual difference between the two requests for the timestamps was zero seconds.

Thus, the client computer 112 employs different calculations to determine the maximum transmission rate, depending on the number of back-to-back packet reports that have been received. Each of these calculations accounts for the impreciseness or "granularity" of the system time. In one embodiment of the invention, if less than five back-to-back packet reports have been received, the client computer 112 proceeds to a state 420. Otherwise, if five or more back-to-back packets have been received, the client computer 122 proceeds to a state 422. It will be appreciated that thresholds other than five back-to-back packets may be used.

At the state 420, the client computer 112 calculates the current bandwidth or maximum available transmission rate based upon the most recent back-to-back packet report which has been received. In one embodiment of the invention, the client computer 112 executes Equation 4.

size=number of bytes of the second data packet in the back-to-back packet report.

second correction factor=a heuristically obtained number to account for impreciseness of time obtained from operating system.

$$\text{bandwidth} = \text{size}/(\text{time} + \text{correction factor}). \quad (4)$$

In one embodiment of the invention, the client computer 112 attempts to compensate for the impreciseness of the system clock by adding a second correction factor to the time that was calculated above in the state 412. In this embodiment, if the size of the second data packet is less than or equal to 500 bytes, the client computer 112 assigns the second correction factor to be equal to 60 milliseconds. Alternatively, if the size of the second data packet is greater than 500 bytes, the client computer 112 assigns the second correction factor equal to be equal to 40 milliseconds. For example, assume that the second data packet was 100 bytes in size and had a second data packet receipt time of 3 milliseconds, that is, according to the system clock, it took 3 milliseconds for the second data packet to arrive after receiving the first data packet. In this example, the second correction factor would be assigned to be 60 milliseconds since the second data packet had under 500 bytes. Further, in this example, the bandwidth would be calculated to be 0.63 bytes per millisecond (100/(3+60 milliseconds)).

Next, at a state 426, the client computer 112 reports the determined bandwidth to selected software components within the client computer 112. For example, in one embodiment of the invention, the client computer 112 provides the determined bandwidth to the packet receiver 200. Optionally, the packet receiver 200, or other selected software component or module, can adjust the transmission rate between the server computer 110 and the client computer 112 based solely, or in part, upon the provided bandwidth.

The process flow then returns to a state 404 wherein the server computer 110 transmits additional packets.

Referring again to the decision state 418, if the client computer 112 (FIG. 1) decides to include additional back-to-back packet reports in the bandwidth calculation, the client computer 112 proceeds to the state 422. At the state 422, the client computer 112 calculates the bandwidth based upon the (i) current back-to-back packet report and (ii) a plurality of previous back-to-back packet reports. In one embodiment of the invention, the client computer 112 incorporates the last five back-to-back packet reports in the bandwidth calculation, thereby using a total of six back-to-back packets in the bandwidth calculation. It will be appreciated that the number of previous back-to-back packet reports may be more or less than five.

In the state 422, the client computer 112 first adds the sizes of each of the second data packets that are associated with each of the six selected back-to-back packet reports. This calculation provides a total packet size. The client computer 112 then sums the respective second data packet receipt times associated with the selected back-to-back packet reports. This calculation provides a total packet time.

In one embodiment of the invention, if the total packet time is determined to be less than 50 milliseconds, the total packet time is multiplied by a factor of 1.2 to account for the impreciseness of the system clock. However, in this embodiment, if the total packet time was initially less than 50 milliseconds, and if the total packet time is determined to be greater than 50 milliseconds after being multiplied by the factor, the total packet time is reset to equal 50 milliseconds.

The client computer 112 then calculates the bandwidth according to Equation 6.

total packet size=the total size of current and previous second data packets.

total packet time=the sum of current and previous second data packet receipt times.

third correction factor=a heuristically obtained value that compensates for impreciseness of the system clock.

$$\text{bandwidth} = \text{total packet size}/(\text{total packet time} + \text{third correction factor}). \quad (6)$$

It is noted that in one embodiment of the invention, the third correction factor is equal to 5 milliseconds, however, it will be appreciated that other correction factors may be used.

As an example, Table 2 illustrates the contents of 6 exemplary back-to-back packet reports.

TABLE 2

| Packet Report | Data Packet Size (bytes) | Second Data Packet Receipt Time |
|---|---|---|
| 1 | 100 | 50 ms |
| 2 | 300 | 162 ms |
| 3 | 200 | 104 ms |
| 4 | 400 | 178 ms |
| 5 | 150 | 73 ms |
| 6 | 150 | 74 ms |

According to contents of the six back-to-back packet reports identified in Table 2, the calculated bandwidth would be 2.01 bytes per millisecond ((100+300+200+400+150+150)/((50+162+104+178+73+74)+5).

The client computer 112 then proceeds to the state 426 (discussed above) to report the calculated bandwidth. The process of monitoring the available bandwidth, in one embodiment, continues until the entire data object 107 is transmitted from the server computer 110 to the client computer 112. However, it will be appreciated that the monitoring of the available bandwidth could be performed at predetermined intervals (based on elapsed time or percentage transmission of the data object), at random intervals or even performed at just one interval.

The transmission latency detector 204 and the transmission bandwidth detector 206 of the present invention advantageously provide for the ability to determine the conditions of a network 100. In particular, the transmission latency detector 204 and the transmission bandwidth detector 206 are especially useful in determining the conditions of low bitrate, such as modems and ISDN.

Using the latency detector 204, an estimate of the relative time it takes for packets to be transmitted from the server computer 110 to the client computer 112 may be calculated. Using this information, software modules, such as the packet receiver 200 can determine whether data packets are backlogged within the network 100. Further, the transmission latency detector 204 of the present invention accounts for possible variations in clock speeds between the server computer 110 and the client computer 112.

Moreover, using the transmission bandwidth detector 206, software modules on the client computer 112, such as the packet receiver 200, can be informed of whether there is congestion in the network. After being informed that the bandwidth is either very high or low, the packet receiver 200 can adjust the transmission rate between the server computer 110 and the client computer 112.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of determining network conditions, the method comprising:
   determining a first time associated with receipt of a first data packet;
   determining a second time associated with receipt of a second data packet sent immediately after the first data packet;
   determining a size of the second data packet;
   calculating a transmission bandwidth by dividing the size of the second data packet by a function of a difference between the first and second times; and
   reading a header in the first data packet, wherein the header includes data indicating the second data packet will be transmitted immediately after transmission of the first data packet to make the first and second data packets back-to-back data packets.

2. The method of claim 1, additionally comprising reporting to a server computer the transmission bandwidth.

3. The method of claim 1, wherein the data packets are two of a plurality of data packets that collectively comprise a portion of a media presentation rendered to a user.

4. A transmission bandwidth detector for determining a bandwidth in data communication, the transmission bandwidth detector arranged to:
   determine a first time associated with receipt of a first data packet;
   determine a second time associated with receipt of a second data packet sent immediately after the first data packet;
   determine a size of the second data packet; and
   calculate a transmission bandwidth by dividing the size of the second data packet by a function of a difference between the first and second times;
   wherein the transmission bandwidth detector is further arranged to read a header in the first data packet, wherein the header includes data indicating the second data packet will be transmitted immediately after transmission of the first data packet to make the first and second data packets back-to-back data packets.

5. The transmission bandwidth detector of claim 4, wherein the transmission bandwidth detector includes computer instructions on a computer readable medium configured to be executed by a computer.

6. The transmission bandwidth detector of claim 4, wherein the transmission bandwidth detector is configured to report the transmission bandwidth to a server computer.

7. The transmission bandwidth detector of claim 4, wherein the data packets are two of a plurality of data packets that collectively provide a streaming media presentation.

8. A system comprising:
   a computer comprising:
      a packet receiver operable to receive data packets via a network;
      and
      a transmission bandwidth detector operable to:
      determine a first time corresponding to receipt of a first data packet;
      determine a second time corresponding to receipt of a second data packet sent immediately after the first data packet;
      determine a size of the second data packet; and calculate a transmission bandwidth by dividing the size of the second data packet by a function of a difference between the first and second times;
      wherein the transmission bandwidth detector is further arranged to read a header in the first data packet, wherein the header includes data indicating the second data packet will be sent immediately after sending the first data packet.

9. The system of claim 8, wherein the transmission bandwidth detector is configured to report the transmission bandwidth to a server.

10. The system of claim 8, wherein the first and second data packets are two of a plurality of data packets that collectively provide a streaming media presentation.

11. The system of claim 8, further comprising: a modem for receiving the data packets.

12. The system of claim 8, wherein the first and second data packets are back-to-back data packets.

13. The system of claim 8, wherein the function of the difference between the first and second times includes a length of time between receipt of the first data packet and receipt of the second data packet.

14. A non-transitory computer readable storage medium storing a program that, when executed by a computer, causes the computer to:
   determine a first time associated with receipt of a first data packet;
   determine a second time associated with receipt of a second data packet sent immediately after the first data packet;
   determine a size of the second data packet; and calculate a transmission bandwidth by dividing the size of the second data packet by a function of a difference between the first and second times;

wherein the program, when executed by the computer, causes the computer to read a header in the first data packet, wherein the header includes data indicating the second data packet will be transmitted immediately after transmission of the first data packet to make the first and second data packets back-to-back data packets.

15. The computer readable storage medium of claim 14, wherein the program, when executed by the computer, causes the computer to:

report the transmission bandwidth to a server computer.

16. The computer readable storage medium of claim 14, wherein the data packets are two of a plurality of data packets that collectively provide a streaming media presentation.

* * * * *